United States Patent [19]

Vaughn et al.

[11] 4,262,501
[45] Apr. 21, 1981

[54] TORQUE CONTROL INSTALLATION AND REMOVAL TOOL

[75] Inventors: John P. Vaughn, Northridge; Charles W. Reynolds, Redondo Beach, both of Calif.

[73] Assignee: VSI Corporation, Pasadena, Calif.

[21] Appl. No.: 952,785

[22] Filed: Oct. 19, 1978

Related U.S. Application Data

[63] Continuation-in-part of Ser. No. 787,466, Apr. 14, 1977, abandoned.

[51] Int. Cl.³ .............................................. F16D 7/06
[52] U.S. Cl. .......................................... 64/29; 81/474
[58] Field of Search ............ 64/29; 81/52.4 R, 52.4 A

[56] References Cited

U.S. PATENT DOCUMENTS

| | | | |
|---|---|---|---|
| 2,802,354 | 8/1957 | Bohnhoff et al. | 64/29 |
| 3,243,024 | 3/1966 | Schwab | 64/29 |
| 3,662,628 | 5/1972 | Schnepel | 81/52.4 A |
| 3,667,250 | 6/1972 | Schnepel | 64/29 |
| 3,702,546 | 11/1972 | Schnepel | 64/29 |
| 3,727,432 | 4/1973 | Eaves et al. | 64/29 |
| 3,942,337 | 3/1976 | Leonard et al. | 64/29 |
| 4,041,729 | 8/1977 | Bilz | 64/29 |

*Primary Examiner*—Ira S. Lazarus
*Assistant Examiner*—Magdalen Moy
*Attorney, Agent, or Firm*—Christie, Parker & Hale

[57] ABSTRACT

A torque control tool for installing and removing threaded fasteners couples a driven section of the tool with a drive section of the tool through detent balls of the former and a clutch plate of the latter. The clutch plate keys to a stem of the drive section for rotation together and has semi-spherical sockets of substantially the same radius of curvature as the balls receiving the balls and lying on a circle about a rotational axis of the driven section. A carrier plate cages the balls so that they index with the clutch plate sockets and keys to the balance of the driven section to transmit torque to it. Reliefs to the side of each socket and centered on the circle of the sockets permit the detent balls to uncouple from the drive section at an applied installation torque less than the uncoupling torque in the opposite, removal direction. The depth of the reliefs leaves substantial spherically curved walls of the sockets opposing uncoupling torques in the installation direction and, accordingly, the balls can only come out of the sockets abruptly with no preliminary rotational movement between the balls and the socket about the rotational axis of the driven section. An axial compressive force acting between an adjustment cap and Belleville springs on the balls and clutch plate determines the torque at which the driven section uncouples from the drive section. A pressure plate interposes between the balls and the Bellevilles. A stem of the drive section couples to the clutch plate through a keyway that permits relative movement of the clutch plate along the axis of the stem. A thrust bearing between the adjustment cap and the clutch plate minimizes rotational drag. The carrier plate and pressure plate key to a housing of the driven section for relative axial movement with respect thereto but for rotation together.

8 Claims, 6 Drawing Figures

TORQUE CONTROL INSTALLATION AND REMOVAL TOOL

CROSS REFERENCE TO RELATED APPLICATION

This is a continuation-in-part application of application Ser. No. 787,466, filed Apr. 14, 1977 now abandoned.

BACKGROUND OF THE INVENTION

The present invention relates to torque control tools in general, and, specifically, to a torque control tool which uncouples a driven end of the tool from a drive end of the tool upon application of a predetermined torque in an installation direction, and which remains coupled in a removal direction at torques higher than the installation torque.

Torque control tools of the type which automatically uncouple a driven section from a drive section are known. Examples of such tools appear in U.S. Pat. Nos. 3,662,628, 3,667,250 and 3,702,546 to Schnepel. U.S. Pat. No. 3,662,628 is typical and will be described. The patentee uses a shaft keyed to a radially extending disc to transmit torque to a driven section of the tool through balls. The balls couple between the driven section and the disc by indexed, semi-spherical pockets in both the disc and the driven section. Springs, such as Belleville springs, act on the disc and apply a compressive force axially of the shaft onto the balls to keep the balls seated in the sockets. When the torque between the driven section and the disc becomes sufficiently great, the balls are forced out of their sockets and the driven section becomes uncoupled from the disc. The spring force can be varied to change the uncoupling torque.

The point at which the driven section becomes uncoupled from the drive section can be considered the uncoupling torque. In the known prior art, the uncoupling torque is the same for both directions of rotation. The tool is typically used in making joints by setting threaded fasteners through the tightening of a nut or bolt on its complement. It is desirable to have removal torque higher than installation torque so that a joint can be broken down without adjustments to the tool or without use of a different tool.

The Schnepel patent also discloses a coupling between the drive shaft and disc which permits relative movement between the two along the axis of the shaft. The stated purpose of this construction permits the shaft to move in response to installer's loading without axially loading the disc.

U.S. Pat. No. 3,727,432 to Eaves et al discloses a torque limiting clutch that uses an inner member coupled to an outer member by balls in radial passages of the inner member. The outer member has axially extending grooves that receive the balls. Viewed in radial cross section normal to the axis of rotation of the Eaves et al device, the grooves on one side have a radius of curvature substantially equal to the radius of the balls and on the opposite side the radius of curvature progressively increases as distance increases away from the portion having circular curvature. Consequently, in the Eaves et al device rotational slippage between the inner and outer member occurs while the balls are in the grooves and before the members uncouple.

SUMMARY OF THE INVENTION

The present invention provides a torque control tool that has an uncoupling torque in one direction which is different from the uncoupling torque in the opposite direction of rotation and which uncouples abruptly.

In one form, the present invention contemplates such a tool wherein the uncoupling torque for rotation in an installation direction is less than the uncoupling torque in a removal direction. A driven section of the tool couples to a drive section of the tool through spherical detent ball means that seat in spherical sockets of substantially the same radius of curvature. The balls and sockets lie on circles of the same radius from the axis of rotation of the tool. The balls and sockets, having substantially the same radius of curvature, prevent any rotational movement of the balls with respect to the sockets about the axis of the tool, although each ball can rotate within the sockets about an axis of rotation through the ball. In other words, the balls cannot move with respect to the sockets as the balls orbit the axis of the tool. When the balls are in the sockets, they rotationally couple the driven section and the drive section of the tool. The socket walls constrain the balls and couple the two sections together in both directions about the axis of the tool. The socket wall constraint can be varied by varying the axial load acting on the balls which tends to keep the balls seated. When out of the sockets, these sections are uncoupled and no torque can be transmitted between them. The wall of each socket against which a ball bears during installation is relieved so that the interference between the affected socket wall and ball is less in an installation direction of rotation than in the opposite, removal, direction of rotation. The relief, however, leaves a substantial portion of the spherical socket wall opposing uncoupling in the installation direction of rotation.

The installation direction of rotation may correspond to right-hand threads of a threaded fastener.

The invention also contemplates the use of a detent assembly that can move axially of the tool in response to the axial position of an adjustment cap. In one form, a clutch plate of the detent assembly keys to a stem of the drive section for common rotation. Torque transmittal means of the assembly, such as a carrier, keys to a housing of the driven section for common rotation and transmittal of torque to the housing. The keyed elements can move axially of the elements they are keyed to. The adjustment cap can be moved axially of the housing to increase or decrease the force applied by spring means on the rotatable elements of the assembly, say the detent balls. The spring means provide an axial constraint against the balls unseating from the sockets. By permitting axial movement of the detent assembly, the movement of the adjustment cap is accommodated. Further, the stem is axially independent of the detent assembly so that no axial loading of the stem is transmitted to the assembly to vary the uncoupling torque.

A particular form of the present invention contemplates as the drive section a stem and a clutch plate of the detent assembly rotationally coupled together through a keyed coupling that permits relative axial movement of the clutch plate on the stem. The stem has wrenching means, such as flats, for being driven by a drive. The stem journals in a journal bearing at its base end in a housing of the driven section. The housing takes the thrust of the stem without the thrust passing through the detent assembly. A carrier plate of the detent assembly and the driven section receives detent balls driven by the clutch plate. The carrier plate keys to the housing to transmit torque to the housing. The housing has wrenching means, such as a socket, for applying installation or removal torque to a fastener, usually through an auxiliary tool. The clutch plate is capable of axial movement with respect to the housing. Spring means, such as stacked Belleville springs, act between the housing and a pressure plate, that in turn acts on the detent balls to apply the axial compressive force necessary to keep the balls seated below the uncoupling torque. A thrust bearing on the clutch plate opposite the carrier plate transmits axial compressive forces to the clutch plate from an adjustment cap. The spring pressure acting on the detent balls varies according to the axial distance between the adjustment cap and the bearing point of the springs on the housing. This distance is preferably adjustable as by a threaded connection between the adjustment cap and the housing. To eliminate or reduce substantially rotational drag which would otherwise affect the accuracy of the uncoupling torque, a thrust bearing interposes between the clutch plate and the adjustment cap. The adjustment cap threads into the housing. The connection between the adjustment cap and the housing must permit relative rotation between the two to permit adjustment of the uncoupling torque. The adjustment cap has means to lock it to the housing so that the predetermined uncoupling torques will not vary. This means preferably comprises a locking clip having a radially extending finger that passes through a slot in the housing and is received in one of a plurality of slots on the radial outside surface of the adjustment cap. The clutch plate has spherically curved sockets with reliefs on the side of the sockets resisting installation torque. The balls seat in the sockets. As before, the sizes of each ball and socket are substantially the same and the relief leaves a substantial portion of spherically curved socket wall on the same side of the socket as the relief to resist uncoupling.

These and other features, aspects and advantages of the present invention will become more apparent from the following description, appended claims and drawings.

DESCRIPTION OF THE PREFERRED EMBODIMENT

Figure 1:
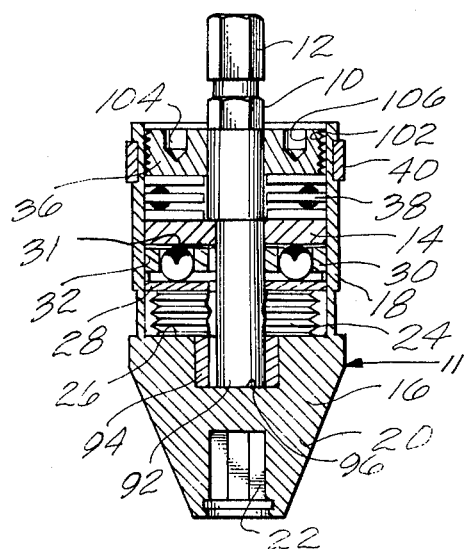
FIG. 1 is an elevational view, mostly in half section, and partly broken away, of the torque control tool of the present invention.
Figure 2:
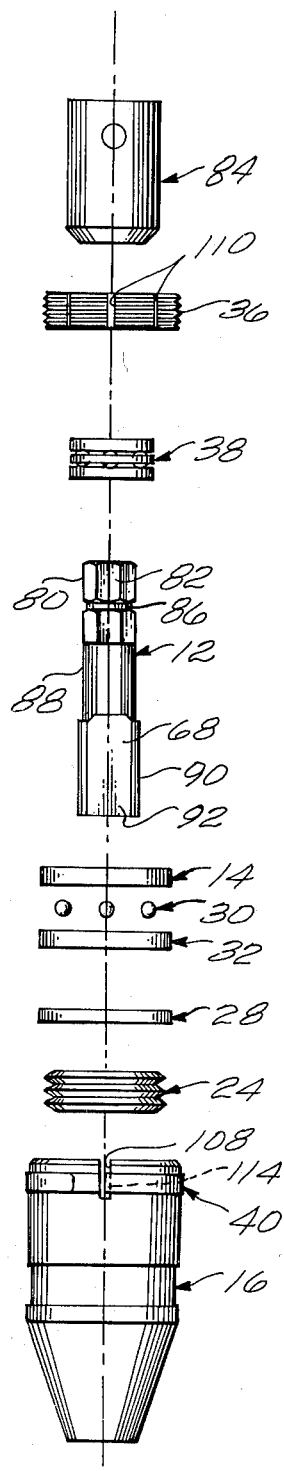
FIG. 2 is an exploded view of the torque control tool of FIG. 1.

FIG. 1 illustrates the general organization of the torque control device of the present invention. FIG. 2 illustrates the important constituent parts of the torque control device exploded.

With reference in general to these two Figures, the device includes a drive section 10 and a driven section 11. The drive section includes a stem 12 and a clutch plate 14. The stem and the clutch plate are keyed together so that the two rotate as one about the axis of the tool which corresponds to the longitudinal axis of the drive section and the driven section. The clutch plate can move longitudinally along the axis of the stem to accommodate clutch plate displacement attendant with adjustment of the uncoupling torque between the drive and driven sections. The coupling keeps longitudinal loads on the stem from being applied to the clutch plate.

Driven section 11 comprises the balance of the torque control device. It includes a housing 16 that has a deep cup 18. The interior of the cup is hollow. A nose 20 of the housing contains a wrenching socket 22 for a mating male wrenching surface of a tool that in turn rotates a fastener. The cup contains stacked Belleville springs 24 bearing on a radially extending bearing surface 26 of the housing and against a longitudinally translatable pressure plate 28. The plate, for its part, bears compressively against a plurality of detent balls 30. Sockets 31 in clutch plate 14 receive balls 30 for transmission of torque to them. A side of each socket is relieved at 33 (see FIGS. 4 and 5) to permit the balls to leave the sockets at an installation torque lower than the torque at which the balls leave the sockets in the opposite, removal direction. The balls receive in a carrier plate 32 and index on the sockets by that plate. Plate 32 keys to the housing wall so that the carrier plate rotates with the housing and transmits torque to it. A coupling for common rotation is also provided between pressure plate 28 and the housing. The pressure plate and carrier plate can move longitudinally of the housing to accommodate adjustments in the uncoupling torque. The pressure plate can also move longitudinally to accommodate the detent balls leaving their sockets in the clutch plate.

An adjustment cap 36 threads into threads of the cup. A thrust bearing 38 disposes between the cup and the upper surface of the clutch plate. A locking clip 40 secures the adjustment cap and prevents its rotation.

In general, wrenching socket 22 is inserted onto the wrenching surfaces of a tool and this tool engaged to a fastener to be set. Stem 12 is then driven in rotation by a drive. When a predetermined torque is reached, detent balls 30 will not rotationally follow clutch plate 14. Instead, the balls will be forced out of sockets 31 of the clutch plate forcing pressure plate 28 and Bellevilles 24 away from the clutch plate in the process.

If for any reason it is necessary to break the joint effected by the tool, then the tool is merely rotated in the opposite direction. The holding capacity of sockets 31 is substantially greater in the opposite direction because there the balls bear against the walls of the sockets opposite recesses 33. The interference between balls and socket walls in the direction of removal rotation is substantially greater than on the side of the sockets with the reliefs.

Figure 3:
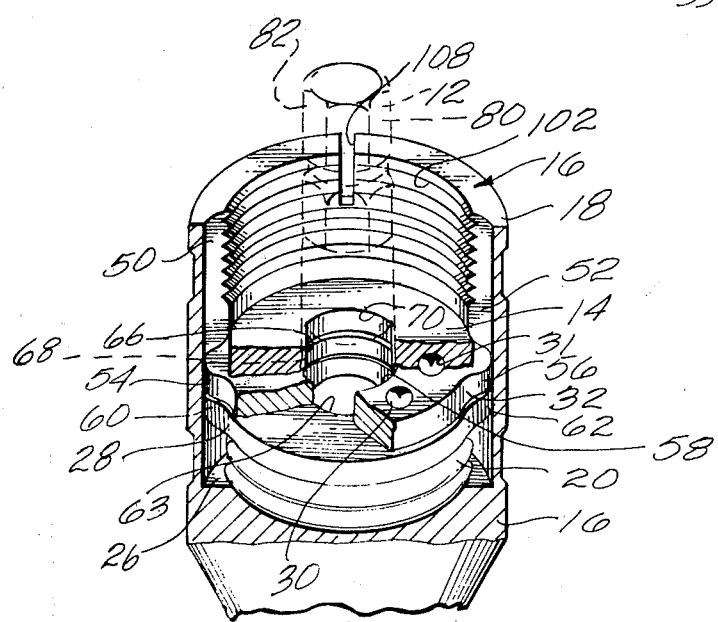
FIG. 3 is a partial perspective view, partly in half section and partly broken away, of the tool of the previous Figures illustrating the torque coupling of the driven section and the drive section of the tool.

With reference to FIG. 3, cup 18 of housing 16 has a pair of diametrically opposite, longitudinally extending, and facing slots 50 and 52. Carrier 32 has diametrically opposite and radially outward extending teeth 54 and 56 disposed respectively in slots 50 and 52. This permits the carrier to move longitudinally along the axis of the housing by the teeth of the carrier sliding in the slots of the housing. The carrier cannot rotate with respect to the housing because the teeth key and therefore interfere with the walls of the slots.

The carrier has an axial bore 58 which passes stem 12. The carrier plate does not directly couple to the stem.

Pressure plate 28 below carrier plate 32 is also provided with diametrically opposite, radially extending teeth 60 and 62 received in longitudinal slots 50 and 52. These teeth provide the same function as teeth 54 and 56 for the carrier and prevent rotation of the pressure plate with respect to the housing while permitting longitudinal movement of the pressure plate with respect to the housing. The pressure plate has an axial bore 63 which passes stem 12.

Clutch plate 14 is also received in the hollow of the cup, but instead of being rotationally coupled to the cup, it is rotationally coupled to stem 12. This coupling is effected through mating flats 66 and 68 of the clutch plate and the stem, respectively. These flats rotationally interfere with one another so that the clutch plate rotationally secures to the stem. The flat engagement, however, does permit longitudinal movement of the clutch plate with respect to the stem to accommodate the different longitudinal positions attendant with different preset uncoupling torques.

The mating flats of the clutch plate and the stem can be regarded as a key of the stem in a keyway of the carrier plate. Clutch plate 14 has an axial bore 70 in receipt of stem 12. One side of this bore defines flat 66. As previously mentioned, there is no rotational coupling of either the pressure plate or the carrier to the stem.

It can be seen from FIG. 3 that rotation of the stem forces rotation of the clutch plate by the interference between flats 66 and 68 of the plate and stem, respectively. Below the uncoupling torque, an axial force on the clutch plate and on the pressure plate keep balls 30 seated in sockets 31 of the clutch plate. As previously mentioned, the occurrance of uncoupling between the drive and driven section of the device follows from balls 30 leaving sockets 31 and this results in axial movement of at least the pressure plate 28. Additional axial movement of the pressure plate, carrier and clutch plate occurs when adjustments are made to the predetermined uncoupling torque. These adjustments relax or compress Belleville springs 24 and require attendant axial movement of the pressure plate, carrier plate, and clutch plate. How this movement is effected is readily apparent in FIG. 3. The facility for longitudinal movement of the clutch plate, carrier plate, and pressure plate with respect to stem 12 makes them independent of applied longitudinal forces on the stem. This means that uncoupling torques are independent of applied longitudinal forces on the stem.

Figure 4:
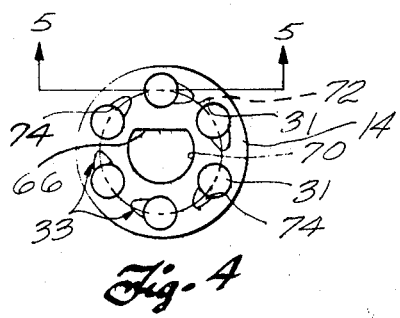
FIG. 4 is a bottom plan view of one of the clutch plates of the present invention showing the relief at one side of the sockets which seat the torque transmitting balls of the device.

With reference to FIG. 4, the bottom of clutch plate 14 is shown in detail. The clutch plate has axial bore 70 and flat 66 which function as previously described. It has six of the detent ball receiving sockets 31. As can be seen in the Figure, reliefs 33 that effect the difference in the installation torque from the removal torque open into the sockets from only one side. A circle 72 on the center of rotation of the balls passes through these recesses. This circle also has as its center the axis of rotation of the entire tool. Each of the recesses has a mouth 74 opening into its cooperating socket. The recesses then taper away from the socket so that the greatest depth of the recess is at the mouth into the socket. Eventually each recess fairs into a lower, generally planar surface of the clutch plate. The reliefs ramp out of the seats.

Each of the sockets 31 is spherically curved and of the same radius of curvature as all the other sockets. Each of the detent balls is also spherically curved and of the same radius of curvature as all the other balls. The radius of curvature of each ball is substantially the same as the radius of curvature of the sockets. A substantial portion of each socket on the relief side thereof has the spherical curvature. In other words, the relief interrupts the spherical socket wall only slightly. The sockets, then, below the uncoupling torques completely interfere and capture the balls and do not permit relative rotational movement between the balls and the clutch plate about the axis of the tool. (Under some circumstances the balls may rotate in place in the sockets about axes of the balls, but not about the rotational axis of the tool.) When uncoupling occurs, the balls abruptly roll out of the sockets and for the first time permit relative rotation between the balls and the clutch plate about the tool axis. This relative rotational movement marks the uncoupling between the drive and driven sections. When uncoupling does occur, each ball steps out of its socket by rolling over the edge of its socket. Each ball during this step out rotates about the edge. After the balls leave the sockets, the drive and driven sections rotate with respect to each other and the balls rotate around the tool axis with the driven section. Resistance to rotation is dominantly by rolling friction. This low resistance occurs even as the balls pass over the reliefs.

Figure 5:
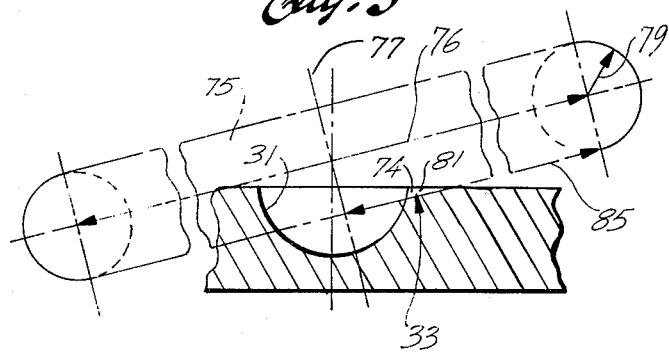
FIG. 5 is a detail of one of the sockets and relief of the clutch plate of FIG. 4.

Preferably each relief is defined as a segment of a toroidal surface. In FIG. 5, a toroid 75 is partly shown. It has a major diameter 76 in the plane of the toroid and is perpendicular to axis 77 of the toroid. The major diameter lies in a bisecting major plane of the toroid. Cutting the toroid by a radial plane containing diameter 76 and axis 77 and perpendicular to the major plane develops a small circle having a radius 79. The small circle of radius 79 is a circle that upon revolution about axis 77 generates the toroid. Radius 79 defines the curvature of the ramp in all radial planes. A radius 85 (one half of diameter 76) defines the curvature of the base of the ramp with respect to axis 77.

Recesses 33 are not deep with respect to the depth of the sockets. In one practical embodiment, the relief is about 0.009 to about 0.011 inches from the adjoining planar surface of the clutch plate. Measured from the same reference, the socket depth is about 0.050 inches, plus or minus 0.0002 inches. This results in an uninterrupted spherical socket wall height on the relieved side of the socket of from about 0.039 inches to about 0.041 inches. The incline of the ramp in this particular embodiment is from about 11° to about 12°. This slight incline does not materially resist ball movement over it and the balls rotate about the axis of the tool as they move over the ramps.

Recesses 33 trail the direction of rotation of the clutch plate during installation, counterclockwise in FIG. 4 (which is a bottom view), so that when the predetermined torque is reached the clutch plate can be said to override the detent balls, with the balls traveling out of the sockets over the ramps.

In different terms, detent balls 30 interfere with the walls of the clutch plate sockets. The depth of the walls of the sockets in the path of the balls on circle 72 is a measure of the interference. The greater the depth, the greater the torque needed to unseat the balls from the sockets. Reliefs 33 present lower interference areas on the adjacent socket walls than do the socket walls opposite the recesses. These opposite socket walls are the bearing walls for the balls when removal torque is applied. The direction of rotation of the clutch plate viewed from the bottom as in FIG. 4 for removal torque is clockwise.

With reference to FIGS. 1 and 2, stem 12 includes male wrenching head 80 having hexagonal wrenching surfaces 82 for cooperative receipt in a wrenching socket of an adapter 84. A detent groove 86 interrupts the wrenching surfaces of the stem and receives a snap ring of the adapter so that the tool and adapter hold together. A cylindrical mid-section 88 of the stem extends from the wrenching section down to flat 68. Flat 68 truncates a cylindrically curved surface 90. A base 92 of the stem journals in a radial bearing 94 of the housing. Flat 68 extends from cylindrical section 88 through base 92 to the end of the stem. The stem also bottoms on a wall 96 of the housing.

Belleville springs 24 stack in series. The illustrated embodiment shows four springs in series, but more or less may be employed. These Belleville springs respond to the force applied on them by wall 26 and pressure plate 28.

With an increase in this force, the Belleville springs tend to collapse, foreshortening the distance they occupy, and vice versa. Stiffness can be increased by using stiffer Belleville springs or stacking them in parallel. Displacement response can be increased by increasing the number of Belleville springs stacked in a series.

Adjustment cap 36 is threadedly received in female threads 102 in the hollow of cup 18. A pair of drillings 104 and 106 receive a spanner setting tool that is used in rotating the adjustment cap. Rotation is in a sense to increase, or decrease, the distance between the cap and surface 26 of the housing, depending on the desired predetermined torque. Once the desired torque is achieved, the adjustment cap is locked so that it cannot rotate with respect to the housing. Locking is effected by a finger of locking clip 40 extending through an axial or longitudinally extending slot 108 of the cup, as seen in FIGS. 2 and 3, and in a similar slot of the adjusting cap. The adjustment cap slots show in FIG. 2, and are indicated there by reference numeral 110. The finger itself is indicated in phantom in FIG. 2 by reference numeral 114.

Thrust bearing 38 interposes between adjustment cap 36 and clutch plate 14 to transmit compressive force between the two and to permit relative rotation between the two without excessive resistance. The thrust bearing is not keyed to either the stem or the housing.

To set a fastener, adapter 84 is snapped over wrenching flats 82 of stem 12. Wrenching socket 22 is passed over a receiving end of a wrenching tool. The wrenching tool is received on the fastener. The fastener is tightened by the application of torque on this train of elements. The resistance to turning of the fastener increases with tightening and this resistance must be overcome by increasing torque for further turning. When the predetermined torque is reached, detent balls 30 abruptly come out of sockets 31, forcing pressure plate 28 axially away from the clutch plate and freeing the stem from the housing until the balls move into the next adjacent sockets. But since the resistance to torque is still just as high, the balls will come out of these seats also. The result is a clicking noise corresponding to the balls going into and out of the seats. If for any reason it is necessary to break down the joint just effected, one merely reverses the direction of the wrenching torque.

When the uncoupling torque in this direction is reached, the balls again abruptly come out of their sockets. In both cases, no rotation of the drive and driven sections with respect to each other occurs until uncoupling. The uncoupling torque is much greater in the fastener removal direction inasmuch as the ramps no longer provide a relief for the balls to come out of the seats. If the predetermined torque needs to be changed, the locking clip is removed and the adjustment cap screwed in or out of the threads to stiffen or relax Belleville spring 24. One of the slots in the adjusting cap is registered with slot 108 of the cup so that the finger of the locking clip can lock the adjustment cap in place.

The present invention has been described with reference to certain preferred embodiments. The spirit and scope of the appended claims should not, however, necessarily be limited to the foregoing description.

What is claimed is:

1. In a torque control tool for setting and removing fasteners and the like, the tool having an axis of rotation, an improvement comprising:
   (a) a drive section including:
      (i) a stem having a longitudinal rotational axis concentric with the axis of rotation;
      (ii) a clutch plate having a flat surface extending radially of the longitudinal axis of the stem; and
      (iii) means coupling the clutch plate and the stem for rotation together and permitting relative longitudinal movement between the clutch plate and the stem along the longitudinal axis of the stem;
   (b) a driven section including a housing receiving the stem and the clutch plate, the stem being journaled for rotation in the housing about the axis of rotation of the tool in both rotational directions, the stem being supported by the housing against relative longitudinal movement between the two, the housing having threads;
   (c) ball and spherical socket means normally coupling the drive and driven section together for rotation about the axis of rotation of the tool by resisting torques about such axis tending to uncouple the two sections, the clutch plate being included in such means, the ball and socket means including a plurality of spherical sockets and a plurality of balls, the radius of curvature of the balls being substantially equal to each other and to the radius of curvature of the sockets, the sockets being in the clutch plate and opening onto the flat surface, each socket normally receiving one of the balls, each ball normally interfering with the wall of the socket that receives it in each direction of rotation about the axis of the tool such that the drive and driven sections are coupled together and cannot rotate with respect to each other about the axis of the tool, the wall of each socket in one of the directions of rotation being relieved so that the depth of each socket at the relief is less than the depth of the socket opposite the relief, each relief defining a ramp from its socket, a step existing between each socket and its associated relief, and a step existing between each socket and the flat surface of the clutch plate on the side of such socket opposite its relief, the interference of each ball with the wall of the socket receiving such ball on the relief side thereof being substantial but distinctly less than the interference of such ball with the wall of the socket opposite the relief, whereby the balls unseat from the sockets and get out of interference with the wall of the sockets at an uncoupling torque applied to the balls about the rotational axis of the tool that is distinctly less on the relieved side of the socket than on the opposite side of the socket, and the drive and driven sections can only rotate with respect to each other about the rotational axis of the tool when the balls are out of the sockets;

(d) a carrier plate coupled to the housing to transmit torque thereto and for relative movement between the two along the longitudinal axis of the stem without relative rotation between the two, the carrier plate having seats for the balls of the ball and socket means so that torque applied on the balls is transmitted to the housing;

(e) means including spring means for applying an axial force on the ball and socket means to tend to force the balls into the sockets and to thereby determine the uncoupling torques; and (f) an adjustment cap threaded into the threads of the housing and acting on the spring means by varying the amount of stress in the spring means by the position of the cap in the threads of the housing, the ball and socket means being interposed between the adjustment cap and the spring means.

2. The tool claimed in claim 1 including a pressure plate bearing on the balls of the ball and socket means and transmitting the force of the spring means to the balls.

3. The tool claimed in claim 2 wherein the pressure plate is coupled to the housing and to transmit torque thereto and for relative movement between the two along the axis of rotation of the tool without relative rotation.

4. The tool claimed in claim 3 wherein the clutch plate has the sockets of the ball and socket means.

5. The tool claimed in claim 1 including:

a pressure plate bearing on the balls of the ball and socket means and coupled to the housing for relative movement between the two along the rotational axis of the tool without relative rotation, the balls being interposed between the clutch plate and the pressure plate, the clutch plate, balls, and pressure plate being in series force relationship along the rotational axis of the tool between the spring means and the housing.

6. A torque control installation and removal tool of the type which uncouples a driven section from a drive section upon the application of a predetermined torque betwen the two sections acting about an axis of rotation of the tool, the tool comprising:

(a) a housing having an axial recess and a radially extending wall at the base of the recess;

(b) means on the housing for applying torque from the tool to a desired object;

(c) spring means in the recess supported by the radially extending wall;

(d) pressure plate means in the recess and acted upon by the spring means;

(e) a plurality of spherical detent balls in the recess bearing on the pressure plate, the radius of curvature of each of the balls being substantially equal to each other ball;

(f) carrier plate means in the recess having a plurality of axial holes therethrough corresponding in number to the number of detent balls, each axial hole being in receipt of one of the detent balls so that the axial holes cage the balls and torque couple the balls to the carrier plate, the axial holes being arrayed in a circle about the axis of rotation of the tool to position the balls on the same circle; p1 (g) clutch plate means in the recess and having a flat surface, a plurality of spherical detent sockets corresponding in number to the number of detent balls opening onto the flat surface, the sockets being arrayed on the circle and each of the sockets normally receiving one of the detent balls, each of the sockets having substantially the same radius of curvature as the balls;

(h) a relief for each of the sockets, each relief opening into its socket on the side thereof bearing against one of the detent balls in such socket in a first direction of rotation about the axis of rotation of the tool to provide a first predetermined interference area, the first direction of rotation corresponding to an installation direction of rotation, the first predetermined interference area being substantial with respect to the relief;

(i) each socket having a wall defining a second predetermined interference area, such wall being in bearing with one of the detent balls in such socket in a second direction of rotation about the axis of rotation of the tool and opposite the first direction of rotation, the second direction of rotation corresponding to a removal direction of rotation, the second predetermined area defining wall also being opposite the relief and being distinctly larger than the first predetermined area;

(j) the first and second interference areas effected by the sockets on the balls substantially preventing rotation of the driven section with respect to the drive section until interference between the balls and the interference areas ceases;

(k) thrust bearing means in the recess engaging the clutch plate;

(l) adjustment cap means compressively engaging the thrust bearing means and being coupled to the wall of the housing to complete a series load path that includes the radial wall at the base of the recess, the spring means, the pressure plate, the detent balls, the clutch plate means, and the thrust bearing means, the adjustment cap means also being coupled to the housing to permit relative axial movement between the two to vary the stress on the spring means and therefore the force tending to hold the detent balls in the detent sockets;

(m) a stem in rotational drive engagement with the clutch plate means and journaled in the housing for rotation with respect thereto about the axis of rotation of the tool without axial movement with respect thereto;

(n) means between the clutch plate means and the stem to permit relative axial movement of the clutch plate means on the stem;

(o) means between the pressure plate means and the housing to permit relative axial movement between the two while locking the two against relative rotation with respect to each other about the axis of rotation of the tool; and (p) means between the carrier plate means and the housing for permitting relative axial movement between the two while locking the two against relative rotation with respect to each other about the axis of rotation of the tool;

whereby the detent balls ride out of their sockets upon the application of a predetermined uncoupling torque in the installation direction of rotation, and remain in their sockets until a larger predetermined torque is applied in the removal direction of rotation, so that the tool is capable of applying a greater torque in the removal direction than in an installation direction, and upon reaching either of the predetermined torques the balls come abruptly out of the sockets and the drive and driven section only then uncouple and rotate with respect to each other about the axis of the tool.

7. The torque control tool claimed in claim 6 wherein each of the reliefs provides a ramp out of its corresponding socket.

8. The torque control tool claimed in claim 7 wherein each of the reliefs has a surface defined by a section of a toroid with the base of the relief having a radius of curvature corresponding to the radius of the toroid in a bisecting plane normal to the axis of the toroid, and the wall of the relief having a radius of curvature corresponding to the radius of the circle that was revolved about the axis of the toroid to generate the toroid.

* * * * *

UNITED STATES PATENT AND TRADEMARK OFFICE
CERTIFICATE OF CORRECTION

PATENT NO. : 4,262,501

DATED : April 21, 1981

INVENTOR(S) : John P. Vaughn and Charles W. Reynolds

It is certified that error appears in the above—identified patent and that said Letters Patent is hereby corrected as shown below:

In the Abstract: Page 1, line 14, "substantial" should be --substantially--.

In the Specification: Column 1, line 18, "torquest" should be --torques--; Column 1, line 52, before "installer's" insert --the--; Column 5, line 39, "occurrance" should be --occurrence--; Column 7, line 41, "lcoking" should be --locking--.

In the Claims: Claim 6, Column 10, line 5, delete "pl(g)"; Column 10, line 6, at beginning of line, insert --(g)--.

Signed and Sealed this

Twenty-first Day of July 1981

[SEAL]

Attest:

GERALD J. MOSSINGHOFF

Attesting Officer

Commissioner of Patents and Trademarks